United States Patent
Eriksson et al.

(10) Patent No.: US 7,047,124 B2
(45) Date of Patent: May 16, 2006

(54) DRIVE UNIT FOR MOTOR VEHICLE

(75) Inventors: Anders Eriksson, Göteborg (SE); Marcus Steen, Angered (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/497,800

(22) PCT Filed: Dec. 5, 2002

(86) PCT No.: PCT/SE02/02244

§ 371 (c)(1),
(2), (4) Date: Apr. 6, 2005

(87) PCT Pub. No.: WO03/048547

PCT Pub. Date: Jun. 12, 2003

(65) Prior Publication Data

US 2005/0181908 A1    Aug. 18, 2005

(30) Foreign Application Priority Data

Dec. 6, 2001   (SE)   ................................. 0104107

(51) Int. Cl.
*G06F 19/00* (2006.01)
(52) U.S. Cl. .................. 701/110; 477/107; 123/350
(58) Field of Classification Search ............... 701/110, 701/114, 102; 477/107, 111; 123/350, 352
See application file for complete search history.

(56) References Cited

U.S. PATENT DOCUMENTS

| | | | | |
|---|---|---|---|---|
| 5,323,746 A | | 6/1994 | Best et al. ................... | 123/357 |
| 5,671,137 A | * | 9/1997 | Ishino et al. ................. | 701/61 |
| 6,089,207 A | | 7/2000 | Goode et al. ................ | 123/357 |
| 6,641,504 B1 | * | 11/2003 | Genise et al. ................ | 477/107 |
| 6,839,619 B1 | * | 1/2005 | Bellinger ...................... | 701/110 |

FOREIGN PATENT DOCUMENTS

| EP | 0 561 382 | 9/1993 |
|---|---|---|
| WO | 97/27388 | 7/1997 |

* cited by examiner

*Primary Examiner*—Hieu T. Vo
(74) *Attorney, Agent, or Firm*—Young & Thompson

(57) ABSTRACT

Drive unit for motor vehicles, comprising an internal combustion engine (2), an accelerator pedal and an electronic engine control unit (15) arranged for controlling engine torque and r.p.m. The accelerator pedal is electrically connected to the engine control unit. During acceleration, the engine control unit controls the torque as a function of engine speed for various accelerator pedal positions, as determined by a first computer matrix stored in the control unit, which provides a predetermined additional torque when there is a certain reduction in engine speed. After constant or practically constant vehicle velocity has been achieved at a constant accelerator pedal position, the engine control unit controls the torque as a function of engine speed along a second stored computer matrix, which provides a predetermined greater additional torque when there is said predetermined reduction of the engine speed.

3 Claims, 3 Drawing Sheets

DRIVE UNIT FOR MOTOR VEHICLE

Figure 1:
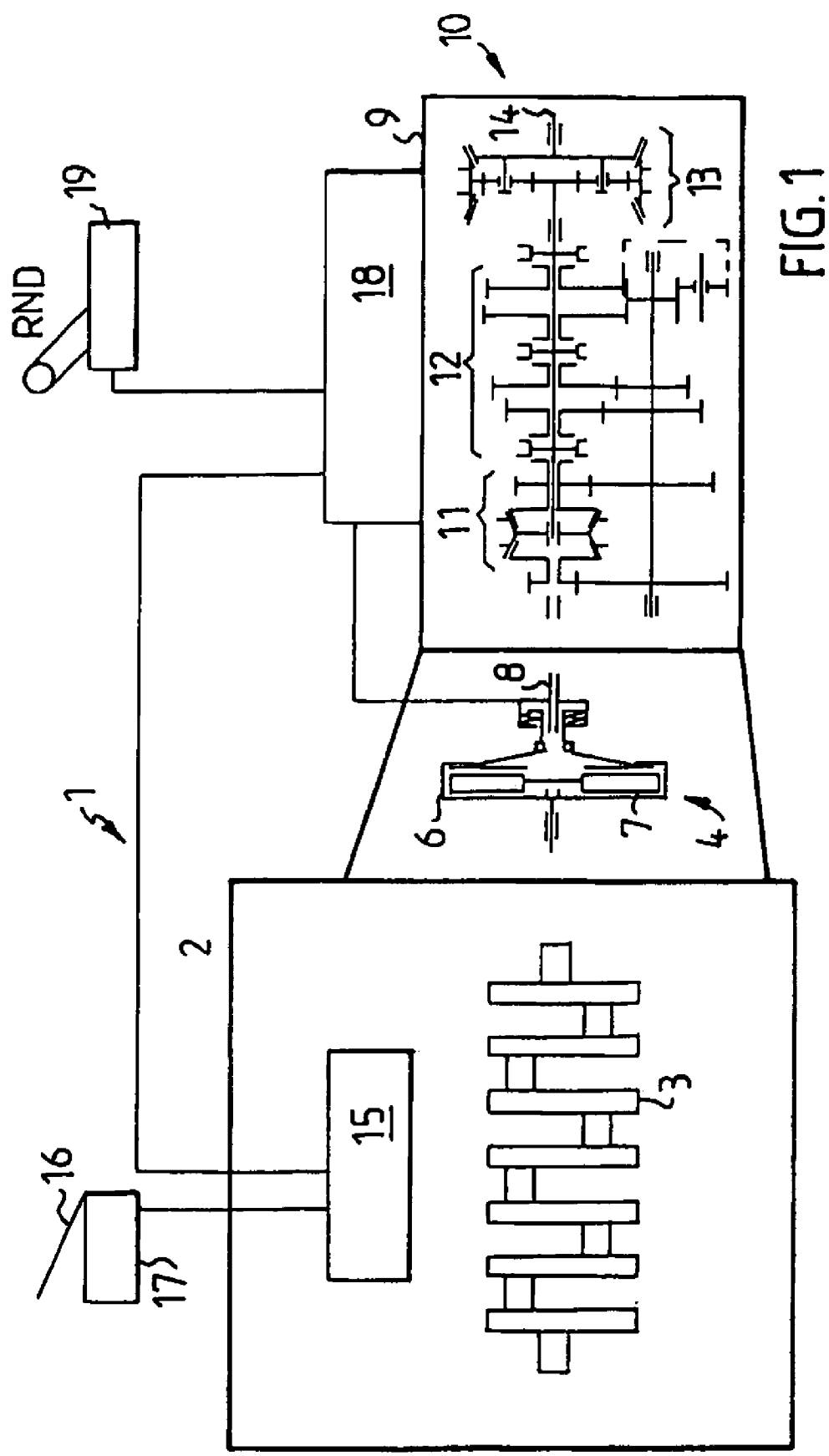

The present invention relates to a drive unit for a motor vehicle, comprising an internal combustion engine, a manually adjustable throttle control and an electronic engine control unit for controlling the engine torque and engine speed, and to which the throttle control is electrically connected, a first computer matrix plotting engine torque as a function of engine speed for various throttle control positions being stored in said engine control unit and having in a diagram a first slope for the curves for the throttle control positions.

It has become more and more common in motor vehicles of late to replace a mechanical wire linkage system coupling the accelerator pedal position or its movement to the engine throttle and fuel engine system with electronic transmission for controlling engine torque and speed. A sensor coupled to the accelerator pedal provides signals representing throttle control position to an electronic control unit, commonly in the form of a microprocessor, which controls engine functions as a function of the sensed throttle control position. To achieve this, a computer matrix mapping engine torque as a function of r.p.m. for various throttle control positions is stored in the control unit.

The matrix should preferably be constructed so that the control unit provides even acceleration for each throttle control position, i.e. with as little jerking as possible when shifting during the acceleration. This is achieved with relatively flat throttle control curves. At the same time the control unit, after having reached the target velocity at constant throttle control position, should be able to maintain this velocity with very small deviations. This, however, is achieved with throttle control position curves which are as deep as possible. Steep curves provide large increases in torque for a minor drop in r.p.m. and speed. When this occurs, however, when shifting up with accompanying reduction in r.p.m., this provides more additional torque than what is desirable and can lead to uneven driving. For these reasons, up to now a throttle control position matrix has been stored in the control unit, which is as good a compromise as possible between control during the acceleration of the vehicle and during cruise operation.

The purpose of the present invention is to achieve a drive unit of the type described by way of introduction, which has a control unit which can control the engine so that the vehicle will be provided with at least almost constant acceleration and a constant velocity when the throttle control position is held constant.

This is achieved according to the invention by virtue of the fact that a second computer matrix, plotting engine torque as a function of engine speed for various throttle control positions, is stored in the engine control unit, that the curves for the throttle control positions in the diagram of the second matrix have a steeper slope than the curves in the diagram of the first matrix, and in that the engine control unit is disposed, at a setting of the throttle control giving rise to an acceleration exceeding a predetermined minimum acceleration, to control the engine torque and engine speed along the curves in the first matrix diagram and, upon a signal indicating a drop below said minimum acceleration, to control the engine torque and engine speed along the curves in the second matrix diagram, so that for a certain change in engine speed, a greater change in torque will be provided than when controlling along the curves in the first matrix diagram.

By the design according to the invention, the first matrix can be optimized for comfortable, smooth acceleration when shifting at constant accelerator pedal position, and the second matrix can be optimized for constant velocity at constant accelerator pedal position. When constant velocity has been achieved after acceleration, i.e. when the acceleration has returned to zero or almost zero, the control unit shifts from control along the throttle control curves of the first matrix to control along the curves of the second matrix, which means that even a small reduction in r.p.m./velocity due to an increase in driving resistance, e.g. a hill, will result in a greater increase in torque and more rapid correction of the velocity than if the first matrix would be the governing matrix, which would only have provided the corre-sponding additional torque after a much greater reduction in the r.p.m./velocity. If the driver opens the throttle to accelerate, the control unit will switch back to the first matrix.

In a preferred embodiment of the drive unit according to the invention, comprising a stepped gearbox coupled to the engine, the slopes of the curves in the first matrix are selected so that they approximate the increments in the gearbox. This means that, at constant throttle control position, the output torque from the gearbox, prior to and after shifting between adjacent shift positions, will be at least approximately constant. By virtue of the fact that the output torque is the same prior to and after shifting, the unavoidable little break in torque delivery, when the clutch between the engine and the gearbox is released, will be unnoticed and the acceleration will be experienced as being constant.

Figure 2:
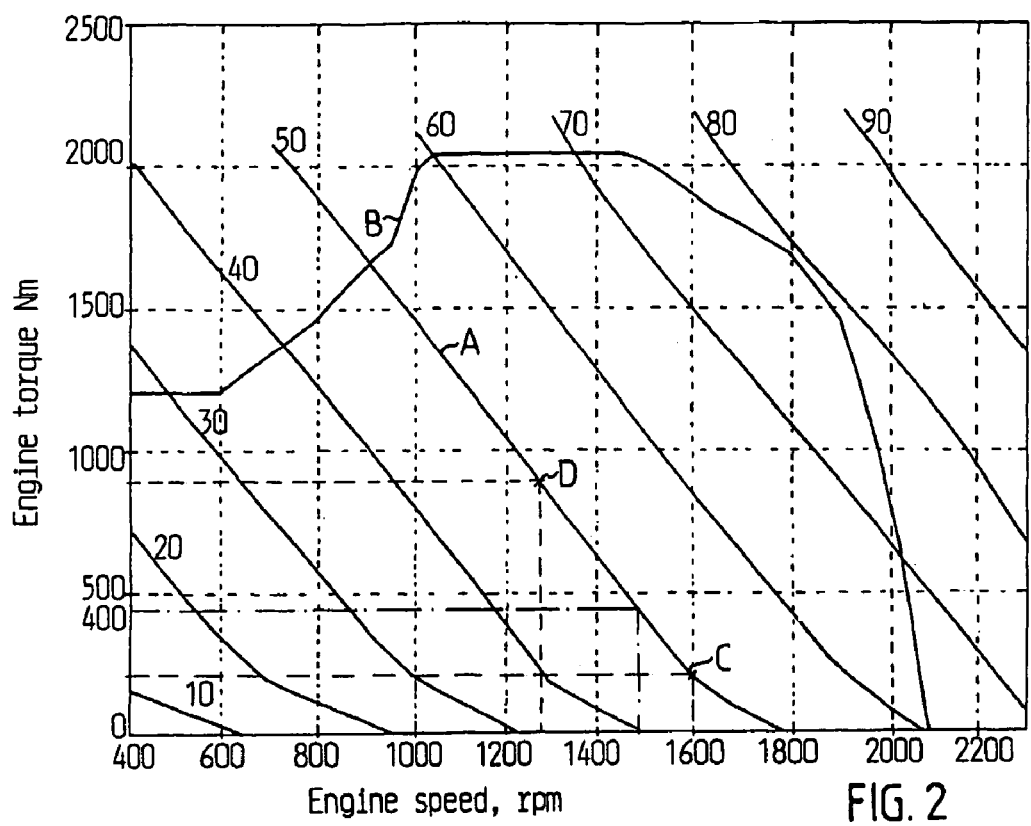
Figure 3:
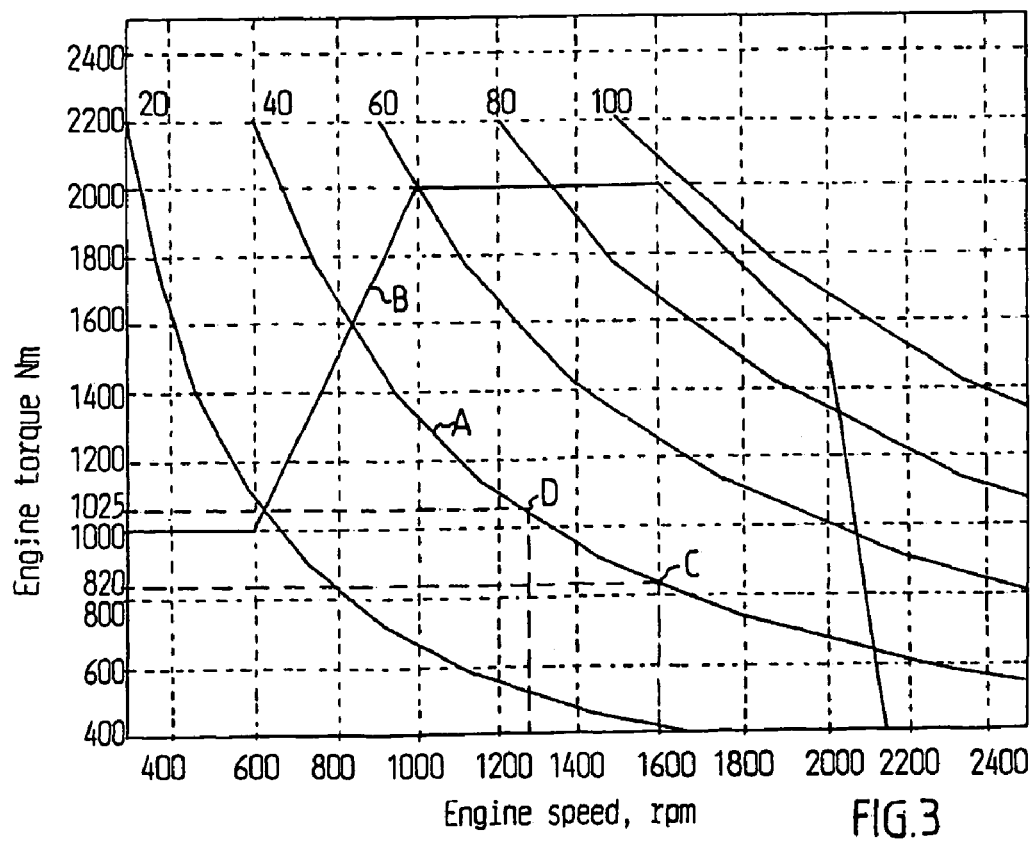
Figure 4:
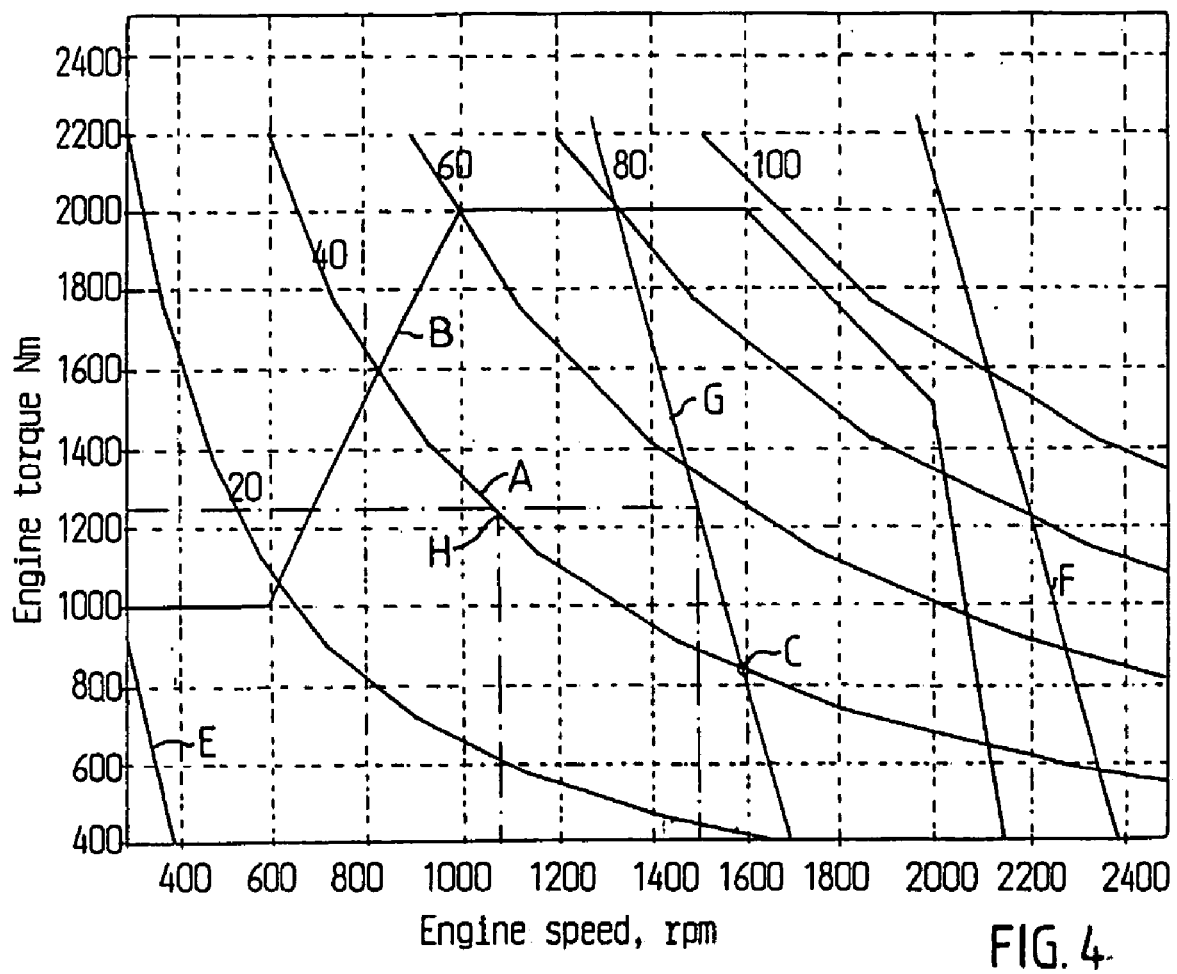

The invention will be described in more detail below with reference to examples shown in the accompanying drawings, where FIG. 1 shows a schematic representation of an internal combustion engine with connected clutch and gearbox, FIG. 2 is a diagram of a previously known throttle control position matrix, FIG. 3 is a diagram of a first throttle control position matrix according to the invention, and FIG. 4 is a diagram of the throttle control position matrix in FIG. 3, together with a second throttle control position matrix.

The drive unit 1 shown in FIG. 1 comprises in the embodiment shown a six-cylinder engine 2, e.g. a diesel engine, the crankshaft 3 of which is coupled to an automated drive disc clutch generally designated 4, which is enclosed in a clutch housing 5. The crankshaft 3 is non-rotatably joined to the clutch housing 6 of the clutch 4, while its disc 7 is non-rotatably joined to an input shaft 8, which is rotatably mounted in the housing 9 of an autoshift gearbox generally designated 10, which in the example has a splitter group 11, a main group 12 and a range group 13. The gearbox 10 has an output shaft 14 intended to be drivably coupled to the vehicle driving wheels, e.g. via a propeller shaft.

The engine 2 is controlled by an electronic engine control unit 15, which can comprise a microprocessor, in response to signals from a position sensor 17 coupled to a throttle control 16, e.g. an accelerator pedal. The transmission 10 is controlled by a transmission control unit 18, which can comprise a microprocessor in response, firstly, to the position of a manual gear selector 19 and, secondly, to control parameters including accelerator pedal position and engine r.p.m. fed into the control unit 18. The transmission control unit 18 communicates with the engine control unit 15 as well. The gear selector 19 has a neutral position N and two automatic drive positions D (forward) and R (reverse) and possibly other positions, permitting the driver to shift manually. In positions R and D, the transmission control unit 18 shifts automatically when starting and driving.

The diagram in FIG. 2 illustrates how previously known engine control units have usually been programmed for controlling engine torque as a function of engine speed for various throttle control positions. Drawn into the diagram are throttle control positions curves A representing from 10% up to 90% of full throttle opening. B indicates the full load limit of the engine. As can be seen from the diagram, no extra torque is obtained between circa 80% and 100% of full throttle opening, since these curves lie outside the full load limit. At point C on curve A representing 50% throttle opening, the engine speed is 1600 r.p.m. and the torque circa 200 Nm. If the transmission ratio in this gear is 1.25:1, a torque of circa 250 Nm will be provided at the output shaft of the gearbox. After shifting up to a gear with ratio 1:1 at constant throttle opening, i.e. still 50%, the r.p.m. will drop to 1280 r.p.m. and the torque will increase to 850 Nm, as can be seen at point D. The torque at the output shaft of the gearbox and thus also to the driving wheels will thus increase more than three times. With the slopes of the throttle control position curves as shown, a reduction in r.p.m. from circa 1600 r.p.m. to circa 1500 r.p.m. (prior to shifting) will increase the torque only to 400 Nm, which means that, if the resistance increases when driving up a hill, for example, the velocity will drop markedly before the additional torque is sufficient to counter the drop in velocity.

FIG. 3 shows a diagram of a computer matrix according to the invention for controlling the torque as a function of engine speed for various throttle control positions during acceleration. The diagram shows throttle control position curves representing 20% up to 100% of full throttle opening. The curve B indicates as above the full load limit of the engine. At point C on the curve A representing 40% of full throttle opening, the engine speed is 1600 r.p.m. and the torque is 820 Nm. With a ratio as above of 1.25:1 in the gear speed in question, the torque at the output shaft of the gearbox will be 1025 Nm. After shifting up to a gear speed with the ratio 1:1 with constant throttle opening, i.e. still 40%, the engine speed will drop to 1280 r.p.m. at the same time as the torque at the output shaft of the gearbox will rise to 1025 Nm, i.e. the same torque as prior to shifting.

FIG. 4 shows the diagram of FIG. 3 with a throttle control position curve G for controlling the torque as a function of engine speed when driving at constant velocity. During acceleration with 40% throttle opening, the torque and the engine speed are controlled along the curve A. At C it is assumed that constant or nearly constant vehicle velocity has been achieved. Thereafter, the transmission control unit 18 switches over the engine control unit 15 to control the torque as a function of engine speed along the curve G, which is preferably as steep as possible for better maintenance of constant velocity. The curve G cannot, however, be infinitely steep. Essen-tially, the curve G can be said to be described by $y=k \times x+m$, where y=torque, k=slope, x=r.p.m. determines where along the 40% curve G is to be placed, i.e. where the acceleration is about zero. m is target velocity controlled (selected constant velocity). The negative slope of G (i.e. k) is primarily dependent on engine speed. In certain cases it can be desirable to have a less steep slope at low r.p.m. than at high r.p.m., i.e. if the acceleration is zero at 800 r.p.m. and 20% throttle opening, the throttle control position curve through this point will not have as steep a slope as that intersecting that of point C. The less steep slope is selected here to reduce the risk that the drive chain will self-oscillate at lower r.p.m. Less steep slope at low r.p.m. will make the system smoother and less sensitive. Self-oscillation can be triggered, for example by driving over a bump. Self-oscillation tendencies in the drive chain have to do with the elasticity of the drive chain, its stiffness, anchoring and what gear ratio is engaged at the time in question. A flattening of the throttle control position curve G at low torque (under 200 Nm) similar to the curves in FIG. 2 is also conceivable. If the driving resistance increases at the same time as the driver maintains constant throttle opening, there will be a substantially greater additional torque for a given drop in speed, which is revealed by the diagram in FIG. 4. With a driving resistance resulting in a drop in engine speed from 1600 r.p.m. to 1500 r.p.m., the torque will increase from 820 Nm to circa 1250 Nm with control along the curve G. For the engine to provide the same torque when controlling along the curve A, the r.p.m. would have to drop to less than 1100 r.p.m.

As soon as the driver changes the throttle control position, the engine control unit will switch to controlling the torque along the curves A. The control unit 15 is, how-ever, preferably programmed to disregard minor accelerator pedal movements which can be caused by bumps in the road. For shifting torque control in accordance with one or the other model, the acceleration does not need to be absolutely zero for switching to control along the curve G. Rather, the control unit can be disposed to switch when the acceleration drops below a pre-programmed minimum value.

The invention has been described above with reference to throttle opening control with an accelerator pedal, but of course also applies to hand-operated controls, i.e. those used to raise or lower the cruise control speed.

The invention claimed is:

1. Drive unit for a motor vehicle, comprising an internal combustion engine (2), a manually adjustable throttle control (16) and an electronic engine control unit (19) for controlling the engine torque and engine speed, and to which the throttle control is electrically connected, a first computer matrix plotting engine torque as a function of engine speed for various throttle control positions being stored in said engine control unit and having in a diagram a first slope for the curves (A) for the throttle control positions, characterized in that a second computer matrix plotting engine torque as a function of engine speed for various throttle control positions is stored in the engine control unit (15), that the curves (G) for the throttle control positions in the diagram of the second matrix have a steeper slope than the curves (A) in the diagram of the first matrix, and in that the engine control unit is disposed, at a setting of the throttle control (16) giving rise to an acceleration exceeding a predetermined minimum acceleration, to control the engine torque and engine speed along the curves (A) in the first matrix diagram and, upon a signal indicating a drop below said minimum acceleration, to control the engine torque and engine speed along the curves in the second matrix diagram (G), so that for a certain change in engine speed, a greater change in torque will be provided than when controlling along the curves in the first matrix diagram.

2. Drive unit according to claim 1, comprising a stepped gearbox (10) coupled to the engine, characterized in that the slope of the curves (A) in the first matrix diagram are selected so that the slope approximately corresponds to the gearshift increments in the gearbox, whereby, at constant throttle control position, the output torque from the gearbox prior to and after shifting between adjacent gear positions will be approximately constant.

3. Drive unit according to claim 2, characterized in that the stepped gearbox (10) is an autoshift gearbox, which is controlled by an electronic control unit (18), which, when a gear selector (19) is in an autoshift position, selects the gear speed in response to various parameters including engine speed and throttle control position, and that the gearbox control unit determines the selection of matrix in the engine control unit.

* * * * *